United States Patent [19]

Keppler et al.

[11] 4,129,706

[45] Dec. 12, 1978

[54] MANUFACTURE OF STYRENE SUSPENSION POLYMERS

[75] Inventors: Hans G. Keppler, Weinheim; Erhard Stahnecker, Heidelberg; Rolf Moeller, Ludwigshafen, all of Fed. Rep. of Germany

[73] Assignee: BASF Aktiengesellschaft, Ludwigshafen am Rhein, Fed. Rep. of Germany

[21] Appl. No.: 825,277

[22] Filed: Aug. 17, 1977

[30] Foreign Application Priority Data

Aug. 28, 1976 [DE] Fed. Rep. of Germany ....... 2638839

[51] Int. Cl.$^2$ ............................................. C08F 12/08
[52] U.S. Cl. ................................ 526/201; 526/233; 526/346; 526/347; 521/56
[58] Field of Search ................................ 526/201, 233

[56] References Cited

U.S. PATENT DOCUMENTS

| | | | |
|---|---|---|---|
| 2,715,118 | 8/1955 | Grim | 526/233 |
| 3,449,311 | 6/1969 | Lowell | 526/233 |
| 3,526,605 | 9/1970 | Ingram | 526/233 |
| 3,539,543 | 11/1970 | Lederer | 526/233 |

*Primary Examiner*—Harry Wong, Jr.
*Attorney, Agent, or Firm*—Keil, Thompson & Shurtleff

[57] ABSTRACT

Process for the manufacture of styrene polymers optionally containing blowing agent by polymerization in aqueous suspension using as the suspension stabilizer a calcium phosphate which after its manufacture by precipitation has been heated in aqueous dispersion for at least 2 hours at from 70° to 130° C. The styrene polymers may be used for the manufacture of foams.

8 Claims, No Drawings

MANUFACTURE OF STYRENE SUSPENSION POLYMERS

The present invention relates to a process for the manufacture of styrene polymers by suspension polymerization.

A suitable method manufacturing styrene polymers is suspension polymerization, in which fine droplets of monomer are suspended in water and polymerized at an elevated temperature in the presence of initiators. When this process is practised industrially, the use of suspension stabilizers is necessary to avoid coalescence of the polymerizing monomer droplets. The suspension stabilizers are to ensure reliable stabilization and to be widely applicable.

In practice, the suspension stabilizers used are mostly macromolecular organic compounds which are water-soluble or water-dispersible. Examples of these are homopolymers or copolymers of vinylpyrrolidone, polymers of acrylic acid, polyvinyl alcohols and cellulose ethers. The use of Pickering dispersing agents has also been disclosed; these are water-insoluble inorganic compounds, the use of which is described, for example, in Houben-Weyl, Volume XIV/1 (1961), pages 420 et seq. Examples of such inorganic compounds are sparingly soluble alkaline earth metal phosphates, carbonates, sulfates and silicates. Calcium phosphates are used most commonly. These inorganic compounds are in general employed in combination with small amounts of genuine emulsifiers or surfactants (Houben-Weyl, Volume XIV/1, page 245). Examples of suitable surfactants are sodium dodecylsulfonate, sodium octyl-sulfate, sodium dioctyl sulfosuccinate, alkali metal arylsulfates and alkali metal salts of fatty acids.

The use of these systems is limited compared to organic suspension stabilizers, since reproducibility and trouble-free course of the suspension polymerization, are restricted to a relatively narrow range. On this matter, Houben-Weyl, page 420, states: "it is hardly possible to specify conditions under which pulverulent dispersing agent is capable of fairly broad application". When combining inorganic compounds with surfactants, the optimum dose must be adhered to precisely, since either too little or too much of the surfactant could result in coagulation of the batch.

It is also to be noted that working up such batches occasionally presents difficulties, since the addition of surfactants causes more or less pronounced foaming of the aqueous phase.

It is an object of the present invention to provide an improved process for the bead polymerization of styrene in the presence of suspension stabilizers, which process permits reliable and reproducible operation with calcium phosphates as suspension stabilizers, in the absence of surfactants or extenders.

We have found that this object is achieved, according to the invention, by using, as the suspension stabilizer, from 0.05 to 1 percent by weight of a calcium phosphate which, after its manufacture by precipitation, has been heated, in aqueous dispersion, for at least 2 hours at from 70° to 130° C.

The calcium phosphates to be used according to the invention are manufactured by precipitation, for example by mixing aqueous solutions of calcium chloride, calcium sulfate or calcium nitrate and sodium phosphate or potassium phosphate, whilst stirring. It is also possible to react calcium hydroxide with orthophosphoric acid. Depending on the chosen conditions, tricalcium phosphate or hydroxyapatite is formed. Advantageously, the calcium phosphate is precipitated at below 60° C, preferably below 40° C. We have found that calcium phosphates which have been manufactured by precipitation from solutions which are too hot do not exhibit an adequate stabilizing action in suspension polymerization so that there is a marked risk of coagulation occurring.

Following the precipitation, the resulting aqueous dispersion of calcium phosphate is heated for at least 2 hours, preferably for at least 4 hours, at from 70° to 130° C, preferably from 80° to 100° C. If temperatures above 100° C are used, the treatment must of course be carried out in a closed pressure vessel.

The particle size of the calcium phosphate can vary within wide limits, i.e., from 0.01 to 100 $\mu$m, depending on the method of manufacture and the shape of the particles; in the case of the hydroxyapatites, the preferred particle size is in the main from 0.01 to 0.1 $\mu$m.

Preferably, the calcium phosphate is employed as a fine aqueous dispersion. However, it is also possible to isolate the particles, dry them, and obtain the appropriate particle size distribution by milling.

We have found that the calcium phosphates manufactured according to the invention possess an excellent stabilizing action and give reproducible results. The calcium phosphate dispersion can be added to the aqueous phase at the start of the suspension polymerization. However, it is also possible, and at times advantageous, to add it during the bead polymerization, or when the conversion is from 5 to 40 percent.

It has already been explained that in carrying out the process of the invention, co-stabilizers in the form of surfactants or extenders are not necessary to achieve stabilization. Only from the point of view of obtaining a narrow bead size distribution has it proved very advantageous to combine the calcium phosphates with conventional organic protective colloids. Polyvinylpyrrolidone, or the protective colloids based on modified polyvinylpyrrolidone described in German Patent Application P 25 48 524.9, are particularly suitable for this purpose. The weight ratio of organic protective colloid to calcium phosphate is preferably from 20 : 1 to 1 : 1.

The process may be used for the manufacture of styrene homopolymers and for the copolymerization of monomer mixtures which contain at least 50 percent by weight of styrene. Suitable comonomers are acrylonitrile, esters of acrylic or methacrylic acid with alcohols of 1 to 8 carbon atoms, N-vinyl compounds, e.g. vinylcarbazole, or small amounts of compounds containing two double bonds, e.g. butadiene, divinylbenzene or butanediol diacrylate.

The polymers are obtained in the form of fine beads by the process of the invention. If the suspension polymerization is carried out in the presence of suitable blowing agents, expandable bead polymers are obtained. Expandable polystyrenes are of particular importance in this context. Expandable polymer beads are obtained if a blowing agent is added to the suspension before, during or after the polymerization. Suitable blowing agents are hydrocarbons which are gaseous or liquid under normal conditions, and which do not dissolve the styrene polymer, and have boiling points below the softening point of the polymer.

Examples of suitable blowing agents are propane, butane, pentane, cyclopentane, hexane, cyclohexane and halohydrocarbons, e.g. methyl chloride, dichlorodifluoromethane or trifluorochloromethane, and their mixtures. The amount of blowing agent used is in most cases from 3 to 12 percent by weight, based on the monomers.

To start the polymerization, organic polymerization initiators which decompose, under the influence of heat, to give free radicals which initiate polymerization, are employed. Examples of conventionally used initiators are peroxides, e.g. benzoyl peroxide, lauroyl peroxide, tert.-butyl peroctoate, tert.-butyl perbenzoate and tert.-butyl perpivalate, and unstable azo compounds, e.g. azodiisobutyronitrile. The initiators are generally employed in amounts of from 0.01 to 1 percent by weight, based on the monomers. The nature of the initiator to be used depends on the envisaged polymerization temperature. It is particularly advantageous to use mixtures of initiators, matching the polymerization temperature to the corresponding half-life of the initiator. As a rule, the polymerization temperature is from 60° to 150° C, preferably from 80° to 120° C.

With expandable polystyrene beads, in particular, the processing characteristics depend greatly on the cell structure. The cell structure, which may be characterized, for example, by specifying the number of cells per mm$^3$, may be varied by using cell-regulating substances.

The manufacture of flame-retardant styrene polymers requires the use of flameproofing agents which are frequently added to the suspension polymerization reaction mixture. Organic halogen compounds, preferably brominated organic compounds, are particularly suitable for this purpose, examples being hexabromocyclododecane or tris-(dibromopropyl) phosphate. Further components which the polymerization batch may contain are organic or inorganic fillers, antistatic agents or plasticizers.

EXAMPLES (A) Manufacture of a calcium phosphate dispersion

1. A solution of 140 g of $CaCl_2 \cdot 2 H_2O$ in 500 ml of water is added uniformly over 10 minutes to a solution of 228 g of $Na_3PO_4 \cdot 12 H_2O$ in 1,000 ml of water whilst stirring at room temperature (the molar ratio of $Na_3PO_4 \cdot 12 H_2O$ to $CaCl_2 \cdot 2 H_2O$ is 1:1.62). This dispersion is then heated for 6 hours at 90° C.

2. The process of manufacture is carried out as described under A 1, except that 184 g of $CaCl_2 \cdot 2 H_2O$ are used (the molar ratio of $Na_3PO_4 \cdot 12 H_2O$ to $CaCl_2 \cdot 2 H_2O$ is 1:2.02).

(B) Bead polymerization 1. 100 parts of water are introduced into a stirred vessel and 100 parts of styrene, 0.15 part of dibenzoyl peroxide and 0.30 part of t-butyl perbenzoate are then added. This mixture is polymerized, whilst stirring, for 6 hours at 90° C followed by 8 hours at 105° C. 90 minutes after reaching 90° C, 5.6 parts of the calcium phosphate dispersion manufactured as described in Example A 1 are added. 3 hours after reaching 90° C, 7 parts of n-pentane are added.

The bead polymer has the following bead size distribution:

| φ: | 2.5 | 2.0 | 1.6 | 1.25 | 1.0 | 0.8 | 0.63 | 0.4 | <0.4 |
|---|---|---|---|---|---|---|---|---|---|
| %: | — | 1.0 | 11.0 | 29.0 | 27.0 | 18.5 | 8.5 | 4.0 | 1.0 |

2. The bead polymerization is carried out as described in B 1, except that 95 parts of styrene and 5 parts of acrylonitrile are used.

The bead polymer has the following bead size distribution:

| φ: | 2.5 | 2.0 | 1.6 | 1.25 | 1.0 | 0.8 | 0.63 | 0.4 | <0.4 |
|---|---|---|---|---|---|---|---|---|---|
| %: | — | — | 7.0 | 19.5 | 19.0 | 21.5 | 17.5 | 14.0 | 1.5 |

3. The polymerization is carried out as described in Example B 1, except that instead of adding dispersion manufactured as described in Example A 1 90 mins. after reaching 90° C, 5.6 parts of the calcium phosphate dispersion obtained as described in A 2 are added 100 mins. after reaching 90° C.

The bead polymer has the following bead size distribution:

| φ: | 2.5 | 2.0 | 1.6 | 1.25 | 1.0 | 0.8 | 0.63 | 0.4 | <0.4 |
|---|---|---|---|---|---|---|---|---|---|
| %: | — | 1.5 | 12.0 | 25.5 | 21.0 | 19.0 | 12.5 | 8.0 | 0.5 |

(C) Comparative experiment

This is carried out as described in Example B 1, except that a calcium phosphate dispersion as described in A 1, but manufactured by precipitation at room temperature without subsequent heating, is used. The batch coagulates 3 hours after reaching 90° C.

We claim:

1. A process for the manufacture of homopolymers of styrene or copolymers of styrene containing at least 50% by weight of styrene by polymerizing the monomers in aqueous suspension in the presence of suspension stabilizers, in which the suspension stabilizer used is from 0.05 to 1 percent by weight, based on the suspension, of a calcium phosphate which, after its manufacture by precipitation, has been heated, in aqueous dispersion, for at least 2 hours at from 70° to 130° C.

2. A process for the manufacture of styrene polymers as claimed in claim 1, in which the calcium phosphate is added to the aqueous phase of the suspension before starting the polymerization.

3. A process for the manufacture of styrene polymers as claimed in claim 1, in which the calcium phosphate is added when the monomer conversion is from 5 to 40%.

4. A process for the manufacture of styrene polymers as claimed in claim 1, in which a calcium phosphate which has been heated for at least 4 hours at from 80° to 100° C is used.

5. A process for the manufacture of styrene polymers as claimed in claim 1, in which a calcium phosphate which has been manufactured by precipitation at below 60° C and then been heated in aqueous dispersion is used.

6. A process for the manufacture of styrene polymers as claimed in claim 1, in which the calcium phosphate is employed as an aqueous dispersion.

7. A process as claimed in claim 1, in which the calcium phosphate is used in combination with organic protective colloids, the weight ratio of organic protective colloid to calcium phosphate being from 20 : 1 to 1 : 1.

8. A process as claimed in claim 7, in which organic protective colloids based on polyvinylpyrrolidone are used.

* * * * *